(12) United States Patent
Boyer et al.

(10) Patent No.: US 7,117,830 B1
(45) Date of Patent: Oct. 10, 2006

(54) SYSTEM AND METHOD FOR DIRECT INJECTION OF GASEOUS FUEL INTO INTERNAL COMBUSTION ENGINE

(75) Inventors: Brad Boyer, Canton, MI (US); William Stockhausen, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 11/285,979

(22) Filed: Nov. 23, 2005

(51) Int. Cl.
*F01L 1/34* (2006.01)
*F02B 17/00* (2006.01)

(52) U.S. Cl. .................................. 123/90.15; 123/295

(58) Field of Classification Search .. 123/90.15–90.18, 123/90.31, 295, 305, 430
See application file for complete search history.

(56) References Cited

U.S. PATENT DOCUMENTS

| 5,941,210 | A | 8/1999 | Hill et al. | |
| 6,675,748 | B1 | 1/2004 | Ancimer et al. | |
| 6,679,206 | B1* | 1/2004 | Takagi | 123/90.15 |
| 2003/0196619 | A1* | 10/2003 | Takagi | 123/90.15 |
| 2005/0188955 | A1* | 9/2005 | Koopmans | 123/435 |
| 2005/0211219 | A1* | 9/2005 | Strom et al. | 123/299 |
| 2006/0005804 | A1* | 1/2006 | Kuo et al. | 123/295 |
| 2006/0005806 | A1* | 1/2006 | Kuo et al. | 123/299 |
| 2006/0016422 | A1* | 1/2006 | Kuo et al. | 123/299 |
| 2006/0016423 | A1* | 1/2006 | Kuo et al. | 123/299 |

FOREIGN PATENT DOCUMENTS

JP 63198765 8/1988

* cited by examiner

*Primary Examiner*—Mahmoud Gimie
(74) *Attorney, Agent, or Firm*—Allan J. Lippa; Alleman Hall McCoy Russell & Tuttle LLP

(57) ABSTRACT

A method for an engine capable of burning gaseous fuel, the engine also including a combustion chamber, at least one intake valve, and at least one exhaust valve, an injector to directly inject pressurized gaseous fuel into the combustion chamber, and a variable valve timing system coupled to the intake valves and exhaust valves, the method comprising closing the exhaust valve before top dead center of piston position to increase combustion chamber pressure achieved at top dead center and to trap exhaust gas in the cylinder; and starting injection of a gaseous fuel directly into the combustion chamber after the exhaust valve is closed and before the intake valve is opened.

20 Claims, 5 Drawing Sheets

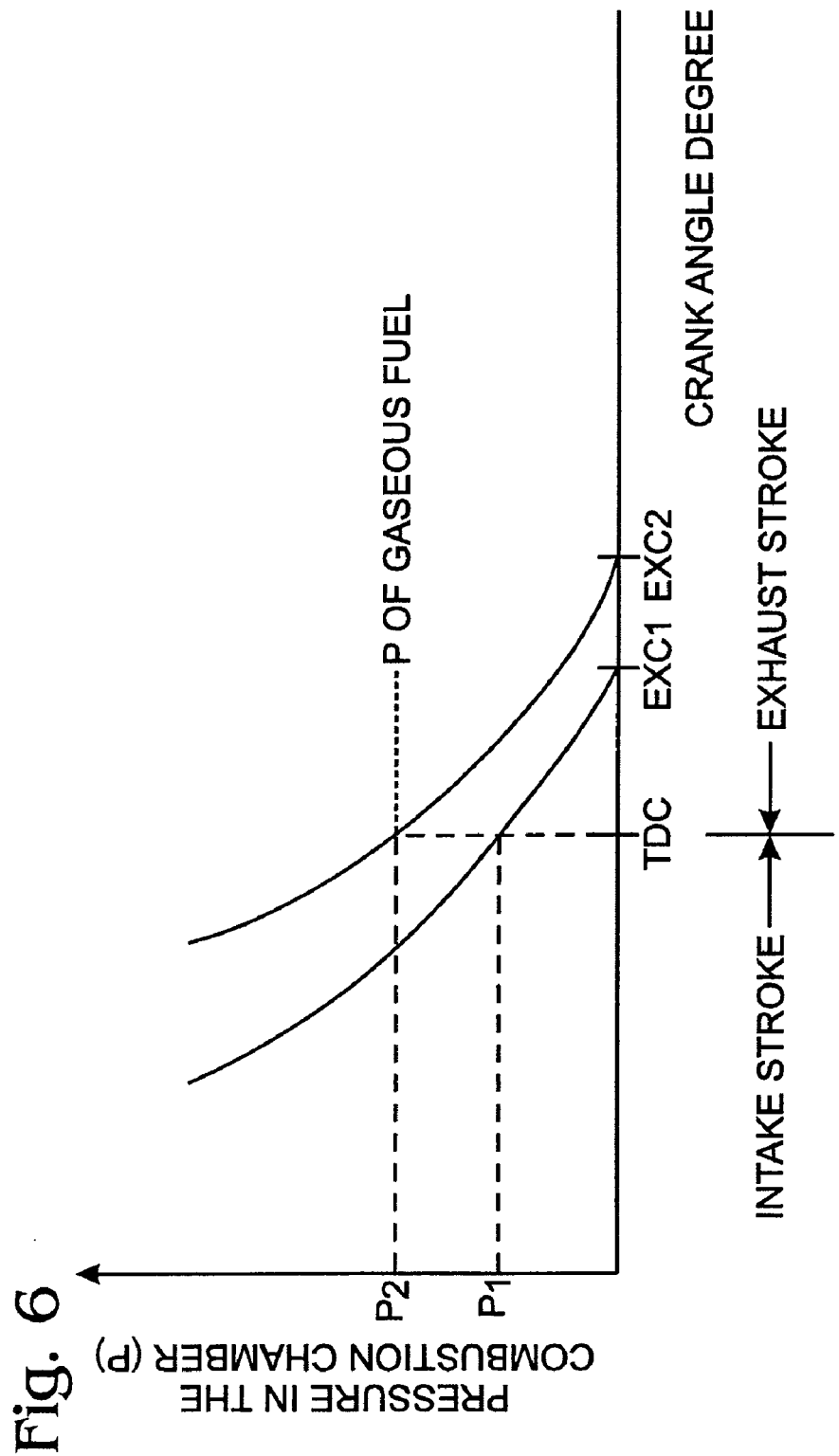

SYSTEM AND METHOD FOR DIRECT INJECTION OF GASEOUS FUEL INTO INTERNAL COMBUSTION ENGINE

FIELD

The present application relates generally to a system and method for direct injection of gaseous fuel, such as hydrogen, into an internal combustion engine, and more specifically to a system and method that utilizes cylinder negative valve overlap of intake and exhaust valves for improving engine efficiency.

BACKGROUND AND SUMMARY

An engine may burn gaseous fuels such as hydrogen ($H_2$), natural gas, lighter flammable hydrocarbon derivatives, etc. Using gaseous fuel in an internal combustion engine can provide various advantages compared to liquid fuel injection, such as reduction of exhaust emissions of nitrogen oxides, particulate matter, and hydrocarbons.

In one approach, a pre-mixed approach (or external mixture formation), which may include port injection, is used to induct gaseous $H_2$. This method may result in reduced volumetric efficiency by a factor of up to thirty percent at stoichiometry due to the displacement of air by the gaseous $H_2$, and a consequent loss in torque and maximum power. Also in these systems, the $H_2$ may be exposed to hot residual gases as well as heated intake manifold and cylinder head porting and cylinder walls during the intake stroke, which can causes a propensity to pre-ignition and further reduction in engine output. Further, such effects can be exacerbated if the $H_2$ injection duration is extended.

One approach to address the issues of pre-mixed delivery is to directly inject the gaseous fuel into the combustion chamber. Specifically, JP 63-198,762 describes a method of directly injecting $H_2$ into a combustion chamber. In the '762 reference, it appears that the exhaust valve is closed very near, if not at, top dead center of piston position when an exhaust stroke is completed, and the hydrogen injection valve is opened immediately after this exhaust valve is closed to inject hydrogen gas into a combustion chamber. Next, after the hydrogen injection valve is closed at the rotation position of the crank angle of about 90 degrees, the suction (intake) valve is opened, and supercharged air is fed to the combustion chamber and mixed with hydrogen. Then, the mixture is compressed and ignited.

However, the inventors herein have recognized several disadvantages of such an approach. For example, when the exhaust valve is closed, the pressure in the combustion chamber may be substantially lower than the injection pressure. Thus, the injected gaseous fuel may undergo a sudden expansion and result in flow losses upon entering the combustion chamber. Further, because cylinder pressure may be reduced during the first part of the intake stroke (before the intake valve is opened), increased pumping work may result. Consequently, any injection energy of the gaseous fuel may not be efficiently utilized. Moreover, a propensity to pre-ignition may still exist at increased load conditions.

In one embodiment, at least some of the above issues may be addressed by a method for an engine capable of burning gaseous fuel, the engine also including a combustion chamber, at least one intake valve, and at least one exhaust valve, an injector to directly inject gaseous fuel into the combustion chamber, and a variable valve timing system coupled to the intake valves and exhaust valves. The method comprises of closing the exhaust valve before top dead center of piston position to increase combustion chamber pressure achieved at top dead center and to trap exhaust gas in the cylinder; and starting injection of a gaseous fuel directly into the combustion chamber after the exhaust valve is closed and before the intake valve is opened.

In this way, it is possible to increase cylinder pressure into which the gaseous fuel is injected, and thereby reduce expansion flow losses, and better utilize the fuel pressure to perform expansion work during the cycle. In one particular example, the exhaust valve closing timing can be varied with operating conditions so that a desired cylinder pressure into which injection occurs can be achieved. In another example, the timing of the intake valve may be adjusted later and varied with operating conditions to reduce any flow of fuel or cylinder contents into the intake manifold.

In other words, by injection of a gaseous fuel near the top dead center of negative valve overlap, it is possible to utilize the injection pressure energy of the gaseous fuel to a greater extent. For example, early exhaust valve closure can elevate the pressure in the combustion chamber at top dead center so that the injected gaseous fuel undergoes less sudden (or dramatic) expansion and thus with less resultant flow losses upon entering the combustion chamber.

Further, the combination of early exhaust valve closure and late intake valve opening can have only a small overall effect on the pumping work. Thus, the injection of gaseous fuel can produce more useful work than that produced by variable intake valve timing alone. Furthermore, in one example, it is possible to reduce a propensity to pre-ignition since by closing the exhaust valve early while enriching the overall air-fuel ratio as load increases, less oxygen is available to cause pre-ignition because residual gases from the previous cycle are left in the combustion chamber. Thus, a propensity of pre-ignition can be reduced even in the conditions where such pre-ignition is most likely to.

According to another aspect, a method is provided for an engine capable of burning gaseous fuel, the engine also including a combustion chamber, at least one intake valve, and at least one exhaust valve, an injector to directly inject gaseous fuel into the combustion chamber, and a variable valve timing system coupled to the intake valves and exhaust valves. The method comprises of adjusting exhaust valve closing timing and keeping intake valve closed to increase a pressure in the combustion chamber approximately equals an injection pressure of gaseous fuel when a piston is at top dead center; injecting gaseous fuel; and opening the intake valve when the pressure in the combustion chamber approximately equals or is less than manifold absolute pressure.

Again, such operation can provide several advantages, such as improved utilization of fuel injection pressure, reduced tendency to pre-ignition, and improved fuel economy.

Note that various intake and exhaust valve configurations may be used, such as electrically actuated valves, variable valve timing, multiple intake valves, multiple exhaust valves, and combinations thereof.

BRIEF DESCRIPTION OF THE DRAWINGS

FIG. 6 is a graph illustrating a relationship between the pressure in the combustion chamber and crank angle, depicting the adjustment of exhaust valve closure timing.

DETAILED DESCRIPTION

Figure 1:
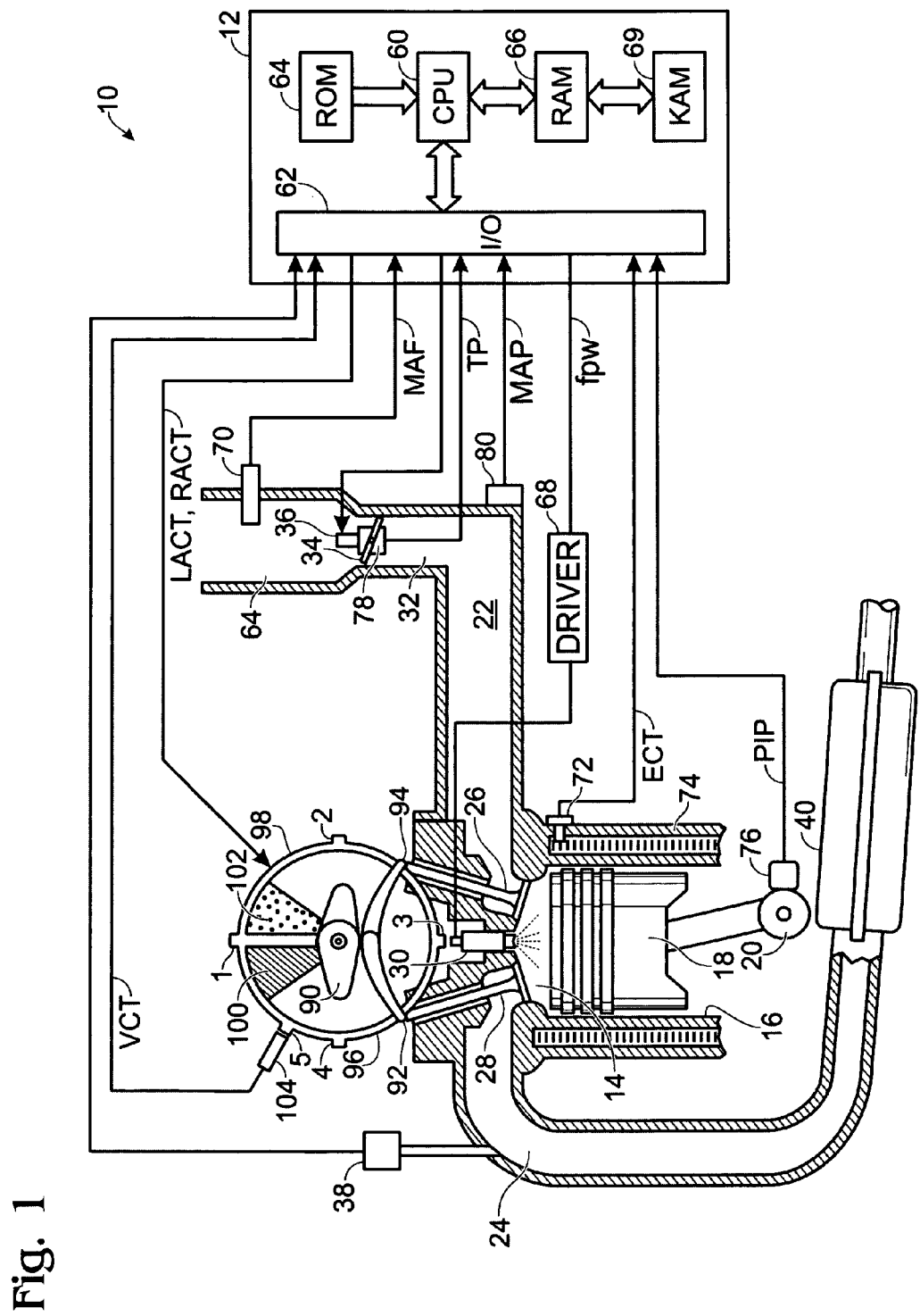
FIG. 1 is a schematic depiction of an exemplary embodiment of an engine burning gaseous fuel.

FIG. 1 shows, generally at 10, an exemplary embodiment of one cylinder of a multi-cylinder engine, intake and exhaust paths connected to that cylinder, and an exemplary embodiment of a camshaft having a variable timing mechanism for controlling the valves of the cylinder. It will be appreciated that the configuration of engine 10 is merely exemplary, and that the systems and methods described herein may be implemented in any other suitable engine. Further, the engine may be spark ignited via a spark plug located in the cylinder (not shown), the timing of which may be varied with operating conditions.

Continuing with FIG. 1, engine 10 is controlled by electronic engine controller 12. Combustion chamber, or cylinder, 14 of engine 10 is shown including combustion chamber walls 16 with piston 18 positioned therein and connected to crankshaft 20. Combustion chamber 14 is shown communicating with intake manifold 22 and exhaust manifold 24 past intake valve 26 and exhaust valve 28. Fuel injector 30 is coupled to combustion chamber 14 for delivering injected fuel directly therein in proportion to the fuel pulse width (fpw) signal received from controller 12 via conventional electronic driver 68. Fuel is delivered to fuel injector 30 by a gasseous fuel system (not shown) including a fuel tank, fuel pumps, and a fuel rail.

Intake manifold 22 is shown communicating with throttle body 32 which contains throttle plate 34. In this particular example, throttle plate 34 is coupled to electric motor 36 so that the position of throttle plate 34 is controlled by controller 12 via electric motor 36. In an alternative embodiment (not shown), throttle body 32 and throttle plate 34 are omitted.

Exhaust gas sensor 38 is shown coupled to exhaust manifold 24 upstream of an aftertreatment device 40. Aftertreatment device 40 may include any suitable type of device for reducing emissions from engine 10. Examples include, but are not limited to, three-way and four-way catalytic converters, particulate filters, lean NOx trap, etc.

Controller 12 is shown in FIG. 1 as a conventional microcomputer, including microprocessor unit 60, input/output ports 62, an electronic storage medium for executable programs and calibration values (shown as read only memory chip 64 in this particular example), random access memory 66, keep alive memory 69, and a conventional data bus. Controller 12 is shown receiving various signals from sensors coupled to engine 10, in addition to those signals previously discussed, including measurement of inducted mass air flow (MAF) from mass air flow sensor 70 coupled to throttle body 32; engine coolant temperature (ECT) from temperature sensor 72 coupled to cooling sleeve 74; a profile ignition pickup signal (PIP) from Hall effect sensor 76 coupled to crankshaft 20; throttle position TP from throttle position sensor 78; and manifold absolute pressure (MAP) signal from sensor 80.

Engine 10 may be configured to have variable intake valve and exhaust valve timing capabilities. For example, engine 10 may include electromechanically actuated valves that are controlled by controller 12. Alternatively, as shown in the depicted embodiment, engine 10 may include a mechanism to mechanically vary the intake and/or exhaust valve timings, for example by adjusting the timing of a camshaft. In the depicted embodiment, camshaft 90 of engine 10 is shown communicating with rocker arms 92 and 94 for actuating intake valve 26 and exhaust valve 28. Camshaft 90 is directly coupled to housing 96. Housing 96 forms a toothed wheel having a plurality of teeth 98. Housing 96 is hydraulically coupled to an inner driving member (not shown), which is in turn directly linked to crankshaft 20 via a timing chain (not shown). Therefore, housing 96 and camshaft 90 rotate at a speed substantially equivalent to the inner driving member. The inner driving member rotates at a constant speed ratio to crankshaft 20. However, by manipulation of the hydraulic coupling as will be described later herein, the relative position of camshaft 90 to crankshaft 20 can be varied by control of hydraulic pressures in advance chamber 100 and retard chamber 102. For example, by allowing high pressure hydraulic fluid to enter advance chamber 100 while allowing fluid to escape from retard chamber 102, the relative relationship between camshaft 90 and crankshaft 20 is advanced. Thus, intake valve 26 and exhaust valve 28 open and close at a time earlier than normal relative to crankshaft 20. Similarly, by allowing high pressure hydraulic fluid to enter retard chamber 102 while allowing fluid to escape from advance chamber 100, the relative relationship between camshaft 90 and crankshaft 20 is retarded. Thus, intake valve 26 and exhaust valve 28 open and close at a time later than normal relative to crankshaft 40.

Teeth 98, being coupled to housing 96 and camshaft 90, allow for measurement of relative cam position via cam timing sensor 104 providing variable camshaft timing (VCT) signal to controller 12. In the depicted embodiment, four teeth (labeled 1, 2, 3 and 4) are provided for measurement of cam timing and are equally spaced (for example, 90 degrees apart from one another) while tooth 5 at a different spacing may be used for cylinder identification. In addition, controller 12 sends control signals to conventional solenoid valves (not shown) to control the flow of hydraulic fluid either into advance chamber 100, retard chamber 102, or neither.

Relative cam timing may be measured using the method described in U.S. Pat. No. 5,548,995, which is incorporated herein by reference. In general terms, the time, or rotation angle between the rising edge of the PIP signal and receiving a signal from one of the plurality of teeth 98 on housing 96 gives a measure of the relative cam timing.

It will be understood that FIG. 1 merely shows one cylinder of a multi-cylinder engine, and that each cylinder has its own set of intake/exhaust valves, fuel injectors, etc. It will further be understood that the depicted engine 10 is shown only for the purpose of an example, and that the systems and methods described herein may be implemented in or applied to any other suitable engine having any suitable components and/or arrangement of components. For example, intake valve 26 and exhaust valve 28 may be electromechanically actuated, and camshaft 90 (and various associated parts) may be omitted. Likewise, separate camshafts may be used to control the opening of intake valve 26 and exhaust valve 28. Where each valve is operated by a separate camshaft, each camshaft may include a variable timing mechanism such as that shown for camshaft 90 in FIG. 1 to allow the exhaust valve timing to be varied independent of the intake valve timing, and vice versa, via a variable cam timing system.

Note that the control and estimation routines included herein-below can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

Figure 2:
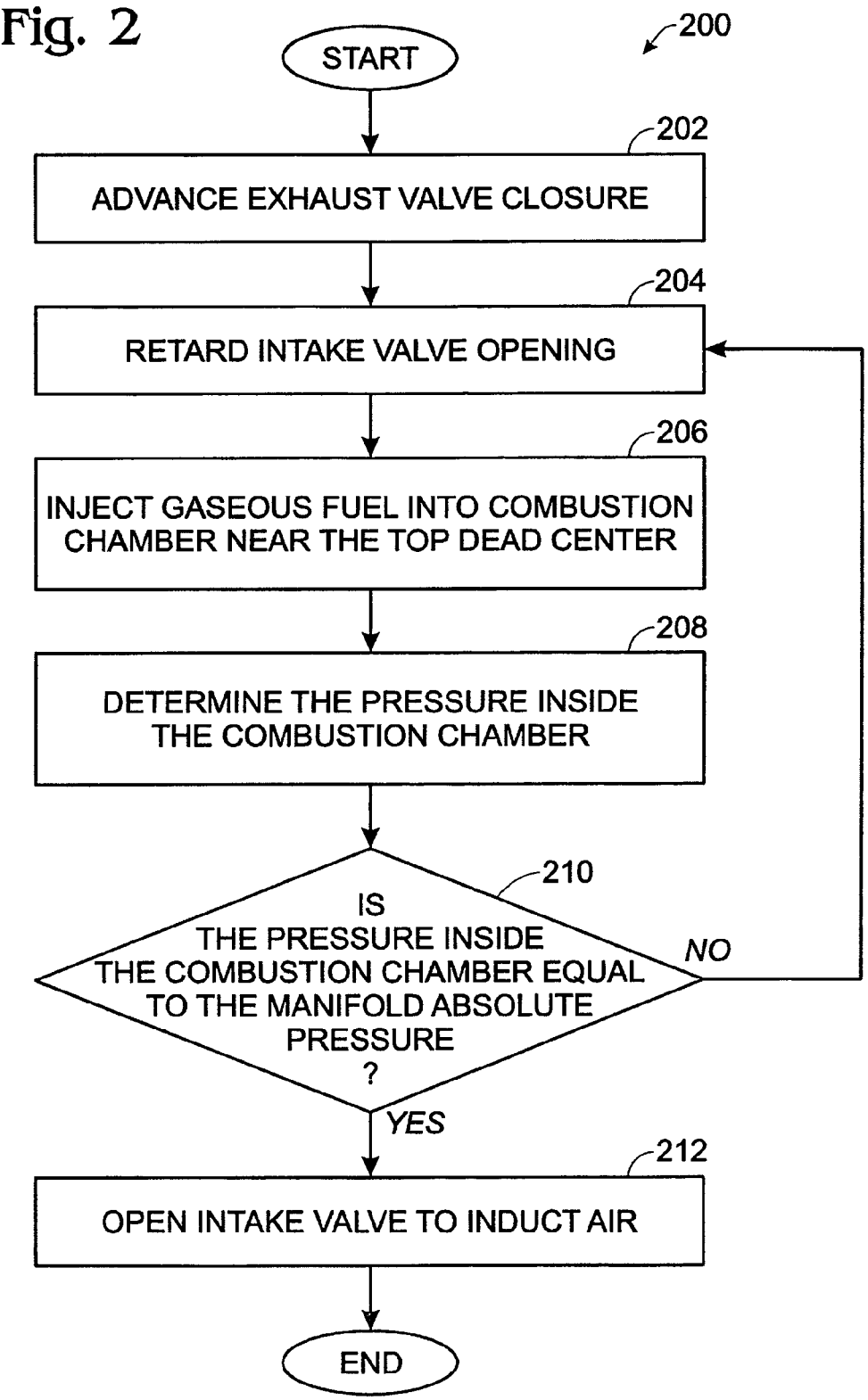
FIG. 2 is a flow diagram of an embodiment of a method of operating an engine burning gaseous fuel.

FIG. 2 shows, generally at 200, a flow diagram depicting an exemplary method or routine of directly injecting gaseous fuel into the combustion chamber during a negative valve overlap condition. Specifically, the routine adjusts exhaust and intake valve opening/closing timing at 202 and 204. In one example, the valve operation is controlled to provide advanced exhaust valve closing before top dead center of the exhaust stroke, and late, or retarded, intake valve opening after top dead center of the exhaust stroke. The intake and/or exhaust valve timing may be adjusted with variation of numerous operating parameters such as, for example, speed, load, temperature, and others to provide desired operation as described in more detail herein. In one particular example, the intake valve opening can be selected to be when the cylinder pressure after or during the hydrogen injection is below manifold pressure so that fresh air flows into the cylinder while reducing any flow of injected fuel to the intake manifold. Further, the exhaust valve closing can be varied to vary a cylinder pressure during the fuel injection to reduce expansion of injected gas. In this way, improved operation may be achieved.

Next, the routine includes, at 206, injecting gaseous fuel into the combustion chamber near the top dead center of a piston position (of the exhaust stroke) during a negative overlap of valve. Next, at 208, the routine determines (monitors or estimates) the pressure in the combustion chamber and then compares the determined pressure of the combustion chamber to the pressure of the incoming fresh air or the manifold absolute pressure. In one embodiment, when the engine is an engine burning on hydrogen, the manifold absolute pressure may be at or slightly below atmospheric pressure. Alternatively, the manifold absolute pressure may be a pressure at a throttled condition. Thus, manifold absolute pressure can be controlled by adjusting throttle position to give desired intake valve opening timing. If the pressure of the combustion chamber determined at 210 is equal to the manifold absolute pressure, the intake valve can be opened to induct air into the combustion chamber at 212, and the value determined at 204 adjusted. The steps of method 200 can then be repeated.

In this way, it is possible to vary intake valve opening timing with manifold pressure variation to reduce flow of gases into the intake manifold. Further, it is possible to better utilize expansion of injected fuel during the cycle and reduce flow losses.

Figure 3:
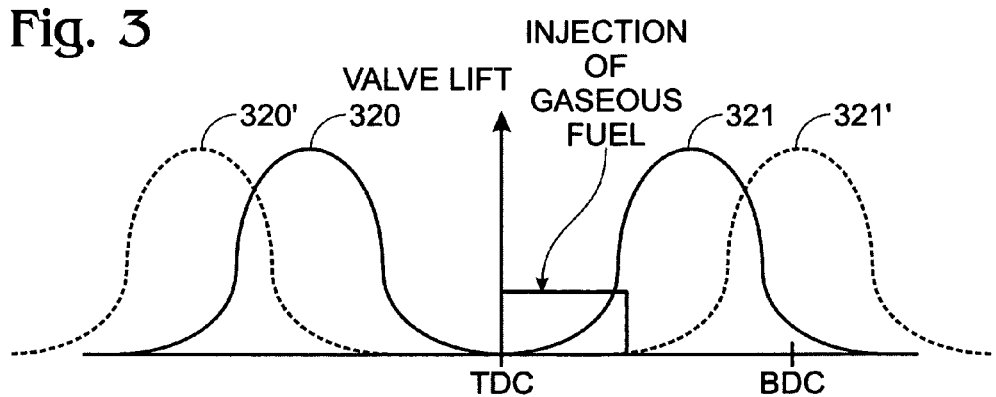
FIG. 3 shows an example of variable valve timing control and injection of gaseous fuel.

Referring now to FIG. 3, an example is shown of variable valve timing control and injection of gaseous fuel. FIG. 3 shows an example of variable valve timing with a base exhaust valve timing shown at 320, and base intake valve timing is shown at 321. Advanced exhaust valve timing is shown at 320', and retarded intake valve timing is shown at 321'. Gaseous fuel may be injected near the top dead center of piston position, and ended before intake valve opening (as shown), or after (not shown).

In this example, exhaust valve timing is advanced symmetric with intake valve timing retard to give symmetric negative valve overlap. It should be noted that the advancement of exhaust valve timing and retardation of intake valve timing may not be the same. For example, as described herein advancement may be greater than retard or vice versa.

Note also that the timing of intake valve 26 and exhaust valve 28 may be adjusted in any suitable manner. For example, where engine 10 utilizes an electromechanically controlled intake valve and exhaust valve, controller 12 may be configured to vary the timing of an actuation signal supplied to the intake valve and exhaust valve. Alternatively, as in the depicted embodiment, controller 12 may be configured to vary the timing of the rotation of camshaft 90 relative to crankshaft 20. As described above, in some vehicles, separate camshafts may be utilized to open the intake and exhaust valves, while in other vehicles, a single camshaft may open both the intake and exhaust valves. Therefore, different timing strategies may be employed for different engine configurations.

The method described above may improve engine efficiency through variable valve timing and timing of gaseous fuel injection. For example, injection of gaseous fuel near the top dead center makes it possible to recover the injection pressure energy of gaseous fuel on the early part of the intake stroke. Variable valve timing further optimizes the utilization of the injection energy of the gaseous fuel. For example, early exhaust valve closure elevates the pressure in the combustion chamber at top dead center of gas exchange. Thus, the injected gaseous fuel does not undergo a sudden expansion and thus resultant flow losses upon entering the combustion chamber may be reduced. Further, the combination of early exhaust valve closure and late intake valve opening enables a greater ability for injection of gaseous fuel without significantly increasing pumping losses.

Another advantage of the example approaches described herein is the propensity to pre-ignition that often occurs in the engines firing on gaseous fuel may be reduced. For example, when the exhaust valve is closed before the top dead center, less oxygen is available to cause pre-ignition as load increases and air-fuel ratio becomes richer because residual gases from the previous cycle may be left in the combustion chamber. Thus, a propensity for pre-ignition can be reduced even in the conditions where pre-ignition may be most likely to occur.

Figure 4:
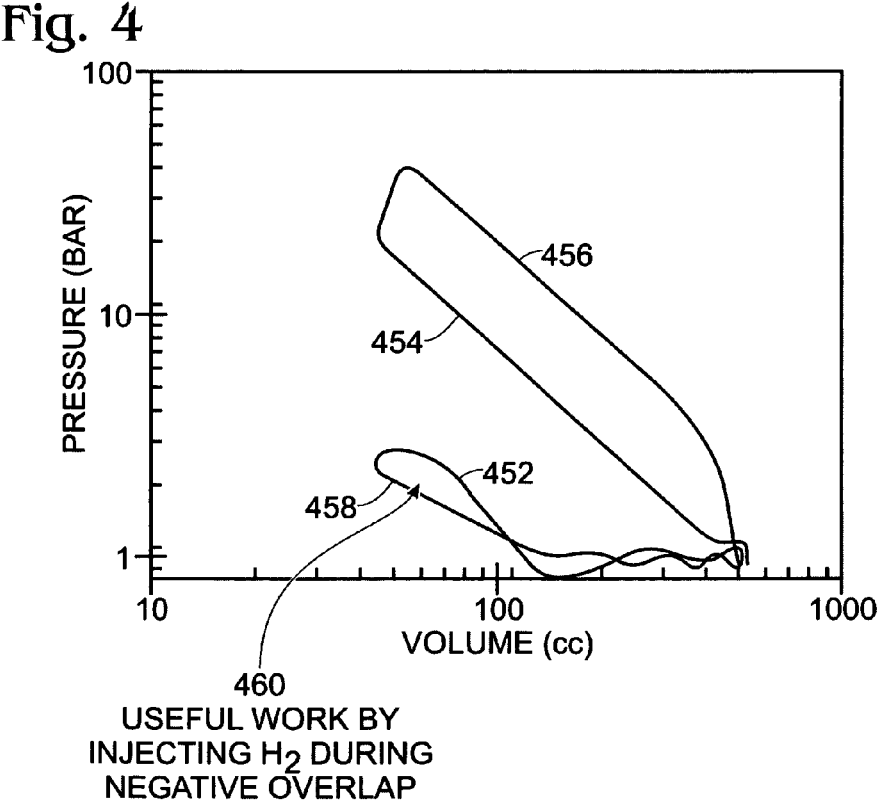
FIG. 4 is a graphical representation of the pressure and volume of a cylinder in an engine burning gaseous fuel during an entire four stroke cycle according to one implementation of the method of FIG. 2.

As stated above, injection of gaseous fuel near the top dead center during negative valve overlap can improve the engine efficiency. This is depicted graphically in FIG. 4, which shows a cylinder pressure v. cylinder volume plot 400 for an engine utilizing an exhaust valve closing timing of 145 degrees before top dead center and an intake valve opening of 145 degrees after top dead center. FIG. 4 shows symmetric negative valve overlap, for a 494 cc/cylinder engine with a 12:1 compression ratio. The intake stroke is shown at 452, the compression stroke is shown at 454, the combustion stroke is shown at 456, and the exhaust stroke is shown at 458.

First, regarding the effect to the exhaust stroke, the early closing of the exhaust valve causes the presence of excess exhaust gas, thus increasing pressure. This adds compression work during the exhaust stroke, which may be recovered during the intake stroke via the late intake valve opening. Second, regarding the effect of the intake stroke, the injection of gaseous fuel raises the pressure at the beginning of the intake stroke. The pressure in the intake stroke is higher compared to pressure in the exhaust stroke until the opening of the intake valve. Thus, injecting gaseous fuel during negative overlap of valve produces useful work as shown by the area in FIG. 4 as indicated by the arrow 460.

Further, it should be noted that the amount of useful work obtained by using variable timing of both the exhaust valve and intake valve may increase in comparison to late intake valve opening timing alone. For example, regarding the effect to the intake stroke, the late opening of the valve causes the piston to generate a reduced pressure during the early phase of an intake stroke, thus adding pumping work. Although the injection of gaseous fuel at the top dead center adds the pressure energy to the intake stroke, this injection pressure may only compensate the additional pumping work due to late intake valve opening, and thus produce less positive work, or none at all.

On the other hand, the overall effect of early exhaust valve closure and late intake valve opening on pumping work is small compared to more conventional valve timing. For example, although early exhaust valve closure adds compression work during the late part of exhaust stroke, energy or work stored by excess exhaust due to the early exhaust valve closure is not released at the end of exhaust stroke due to the late opening of the intake valve. In addition, there is no vacuum or less vacuum during the early phase of an intake stroke because of the existence of exhaust gas after early exhaust valve closure. Therefore, pumping work may not be increased, or any increase is reduced, by using variable timing of both the exhaust valve and intake valve. Consequently, the injection energy of gaseous fuel is better utilized by injecting gaseous fuel during a valve negative overlap.

It will be appreciated that the method described above may be modified to further improve engine efficiency. For example, the closure timing of exhaust valve may be adjusted according to the actual or estimated pressure in the combustion chamber during the exhaust stroke and the pressure of gaseous fuel to be injected in order to reduce the flow loss of injected gaseous fuel. Further, the opening timing of the intake valve may be adjusted according to the manifold absolute pressure. Thus, both intake valve and exhaust valve timing may be adjusted based on the actual or estimated pressure in the combustion chamber. Note that the combustion chamber pressure may be estimated using pressure-volume relationships with information of crank angle position and/or piston position and valve opening/closing timings.

Figure 5:
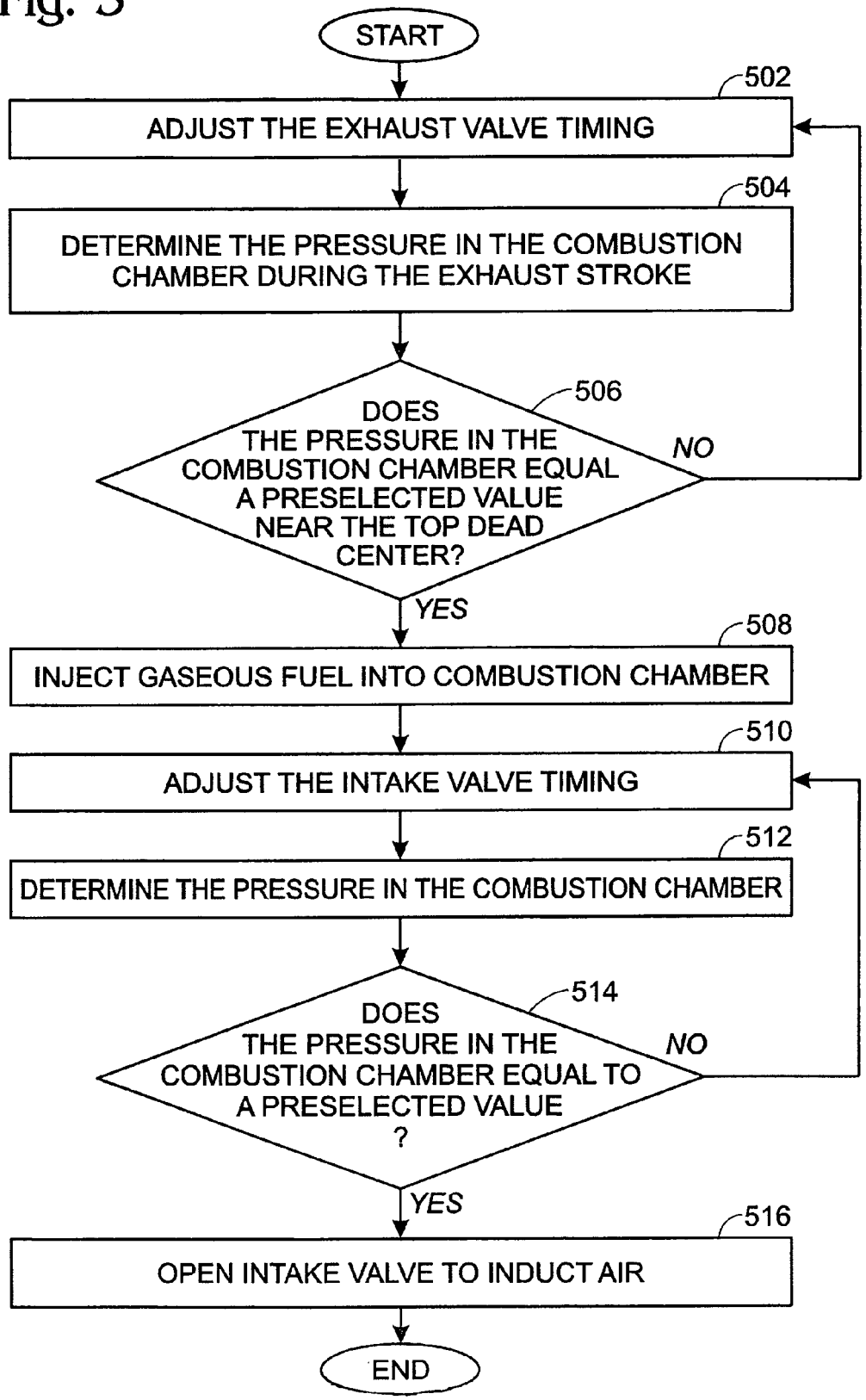
FIG. 5 is a flow diagram of an embodiment of another method of operating an engine burning gaseous fuel.

Another example embodiment of an engine control method 500 is described in FIG. 5. Method 500 includes, at 502, adjusting the exhaust valve timing to a timing selected to give a desired cylinder pressure during gaseous fuel injection. Next, the method determines the pressure in the combustion chamber during the exhaust stroke at 504 and then compares it at 506 to a pre-selected pressure value. The pre-selected pressure value may be the pressure of gaseous fuel to be injected, for example, which may vary with operating conditions such as temperature, etc. When the exhaust valve is closed early during the exhaust stroke, the pressure in the combustion chamber is increased during the end of the exhaust stroke. In some embodiments, the adjustment of exhaust valve timing may include early exhaust valve closing at a proper time or angle so that the pressure in the combustion chamber is increased to the pre-selected pressure value at top dead center. If the pressure in the combustion chamber is determined at 506 to be approximately equal to the pre-selected pressure value, then at 508 the method injects gaseous fuel into the combustion chamber. Otherwise, the method may further adjust exhaust valve timing.

From 508, the method continues to 510 to adjust the intake valve timing. Then, at 512, the method includes determining the pressure in the combustion chamber during the intake stroke, and then comparing the determined pressure at 514 to a pre-selected pressure value. The pre-selected value may be the manifold absolute pressure, for example. As a piston expands after the injection of gaseous fuel and before the opening of the intake valve, the pressure in the combustion chamber may be decreased. In some embodiments, adjustment of intake valve opening timing may include the late opening of the intake valve so that the pressure in the combustion chamber is decreased to a pressure of the pre-selected value. If the pressure in the combustion chamber determined at 512 approximately equals the pre-selected value, the intake valve is opened to induct fresh air into the combustion chamber. The above steps may then be repeated.

In addition to the advantages described above for the injection of gaseous fuel during the negative overlap of valve, the method 500 may further improve the engine efficiency by preventing flow losses of the gaseous fuel. For example, by closing the exhaust valve before top dead center, the cylinder pressure may be increased to a desired pressure based on the fuel injection pressure, thereby providing reduced flow losses. Further, by varying the intake valve opening timing with manifold pressure, improved induction may be achieved.

Referring now to FIG. 6, a schematic view is shown of the relationship between the pressure in the combustion chamber and the crank angle, depicting the adjustment of exhaust valve timing. As shown by FIG. 6, the exhaust valve is closed early during the exhaust stroke. As the exhaust valve is closed, the pressure in the combustion chamber is increased. With different exhaust valve closing timings EXC1 and EXC2, for example, the pressures in the combustion chamber at top dead center are different as indicated by P1 and P2, respectively. FIG. 6 also shows the pressure of gaseous fuel as approximately equal to P2. In this case, the exhaust valve will be closed at EXC2 so that the pressure in the chamber is approximately the same as the pressure of gaseous fuel at top dead center. As the pressure of gaseous fuel changes, the pressure in the combustion chamber may be varied by adjusting the exhaust valve closing timing. Thus, gaseous fuel may be injected near top dead center with minimized loss of injection energy, even under varying conditions.

It will be appreciated that the processes disclosed herein are exemplary in nature, and that these specific embodiments are not to be considered in a limiting sense, because numerous variations are possible. The subject matter of the present disclosure includes all novel and nonobvious combinations and subcombinations of the various camshaft and/or valve timings, fuel injection timings, and other features, functions, and/or properties disclosed herein.

Furthermore, the concepts disclosed herein may be applied to dual fuel engines capable of burning various types of gaseous fuels and liquid fuels.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine capable of burning gaseous fuel, the engine also including a combustion chamber, at least one intake valve, and at least one exhaust valve, an injector to directly inject gaseous fuel into the combustion chamber, and a variable valve timing system coupled to the intake valves and exhaust valves, the method comprising:
   closing the exhaust valve before top dead center of piston position to increase combustion chamber pressure achieved at top dead center and to trap exhaust gas in the cylinder, and
   starting injection of a gaseous fuel directly into the combustion chamber after the exhaust valve is closed and before the intake valve is opened,
   wherein the exhaust valve closing is varied in response to injection pressure of the gaseous fuel, and the intake valve opening is varied in response to manifold pressure.

2. The method of claim 1, wherein the gaseous fuel is injected near top dead center of the valve overlap.

3. The method of claim 2, wherein the pressure in the combustion chamber is approximately the same as the injection pressure of the gaseous fuel.

4. The method of claim 1, wherein the intake valve is open after the injection of the gaseous fuel is completed.

5. The method of claim 1, wherein the intake valve is open during the injection of the gaseous fuel.

6. The method of claim 1, wherein the intake valve is open when the pressure in the combustion chamber has been expanded to the same pressure as that of the manifold.

7. The method of claim 6, wherein the manifold pressure is atmospheric pressure.

8. The method of claim 6, wherein the manifold pressure is the pressure in a throttled condition.

9. The method of claim 1, further comprising varying said exhaust valve closing timing with an operating condition.

10. The method of claim 1, wherein the engine is a dual fuel engine.

11. A method for an engine capable of burning gaseous fuel, the engine also including a combustion chamber, at least one intake valve, and at least one exhaust valve, an injector to directly inject gaseous fuel into the combustion chamber, and a variable valve timing system coupled to the intake valves and exhaust valves, comprising:
   adjusting exhaust valve closing timing and keeping intake valve closed to increase a pressure in the combustion chamber to be approximately equal an injection pressure of gaseous fuel when a piston is at top dead center;
   injecting gaseous fuel; and
   opening the intake valve when the pressure in the combustion chamber approximately equals or is less than manifold pressure.

12. The method of claim 11, wherein the gaseous fuel is injected near top dead center of the valve overlap.

13. The method of claim 11, wherein the intake valve is opened after the injection of the gaseous fuel is completed.

14. The method of claim 11, wherein the intake valve is opened during the injection of the gaseous fuel.

15. The method of claim 13, wherein the gaseous fuel is hydrogen.

16. The method of claim 13, wherein the engine is a dual fuel engine.

17. A method for an engine capable of burning gaseous fuel, the engine also including a combustion chamber, at least one intake valve, and at least one exhaust valve, an injector to directly inject gaseous fuel into the combustion chamber, and a variable valve timing system coupled to the intake valves and exhaust valves, comprising:
   adjusting exhaust valve closing timing so that a pressure in the combustion chamber approximately equals an injection pressure of gaseous fuel when a piston is at top dead center;
   injecting gaseous fuel;
   adjusting an operating parameter to vary manifold pressure; and
   adjusting intake valve opening timing so that the pressure in the combustion chamber at intake valve opening approximately equals or is less than manifold pressure.

18. The method of claim 17, wherein said operating parameter is a throttle plate.

19. The method of claim 17, wherein the intake valve is opened after the injection of the gaseous fuel is completed.

20. The method of claim 17, wherein the intake valve is opened during the injection of the gaseous fuel.

* * * * *